United States Patent
Grunnet et al.

(10) Patent No.: US 10,982,650 B2
(45) Date of Patent: Apr. 20, 2021

(54) WIND TURBINE SYSTEM WITH MULTIPLE ROTORS

(71) Applicant: VESTAS WIND SYSTEMS A/S, Aarhus N (DK)

(72) Inventors: Jacob Deleuran Grunnet, Tranbjerg J (DK); Erik Carl Lehnskov Miranda, Randers (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 270 days.

(21) Appl. No.: 16/079,189

(22) PCT Filed: Feb. 24, 2017

(86) PCT No.: PCT/DK2017/050047
§ 371 (c)(1),
(2) Date: Aug. 23, 2018

(87) PCT Pub. No.: WO2017/144063
PCT Pub. Date: Aug. 31, 2017

(65) Prior Publication Data
US 2019/0093630 A1 Mar. 28, 2019

(30) Foreign Application Priority Data
Feb. 26, 2016 (DK) .............. PA 2016 70109

(51) Int. Cl.
*F03D 7/02* (2006.01)
*F03D 1/02* (2006.01)

(52) U.S. Cl.
CPC .......... *F03D 7/0224* (2013.01); *F03D 1/02* (2013.01); *F03D 7/0296* (2013.01);
(Continued)

(58) Field of Classification Search
None
See application file for complete search history.

(56) References Cited

U.S. PATENT DOCUMENTS 4,710,100 A * 12/1987 Laing ..................... F03D 9/28
416/11
6,749,399 B2 * 6/2004 Heronemus ............. A61P 27/02
416/41
(Continued)

FOREIGN PATENT DOCUMENTS

CN 101881256 A 11/2010
DE 29715249 U1 12/1998
(Continued)

OTHER PUBLICATIONS

Chinese Office Action for Application No. 201780025670.0 dated Sep. 23, 2019.
(Continued)

*Primary Examiner* — David Hamaoui
*Assistant Examiner* — Jason Fountain
(74) *Attorney, Agent, or Firm* — Patterson + Sheridan, LLP (57) ABSTRACT

The invention relates to a wind turbine system (1) with several wind turbine modules (2) mounted to a support structure (3). A control system is configured to determine a lift command (21) for a particular wind turbine module (2') of the 5 plurality of wind turbines modules (2). The control system is applying the lift command (21) to a corresponding rotor blade pitch adjustment system of the particular wind turbine module (2') so as to create a lift force (F_up) in the opposite direction of gravity on the particular wind turbine module mounted on the support structure. Providing an upwards lift force on one, or more, particular 10 wind turbine module(s) may reduce, or eliminate, static and/or dynamical loads from the wind turbine module on the support structure.

22 Claims, 7 Drawing Sheets

(52) U.S. Cl.
CPC ....... *F05B 2260/70* (2013.01); *F05B 2260/96* (2013.01); *F05B 2270/328* (2013.01); *F05B 2270/331* (2013.01); *Y02E 10/72* (2013.01)

(56) References Cited

U.S. PATENT DOCUMENTS

| | | | | |
|---|---|---|---|---|
| 8,070,439 | B2* | 12/2011 | Melius | F03D 7/0224 |
| | | | | 416/61 |
| 8,810,055 | B2* | 8/2014 | Mascarell | F03D 7/0276 |
| | | | | 290/44 |
| 9,523,352 | B2* | 12/2016 | Hernandez Mascarell | |
| | | | | F03D 7/024 |
| 10,655,596 | B2* | 5/2020 | Benazzi | F03D 7/0204 |
| 2003/0170123 | A1* | 9/2003 | Heronemus | A61P 29/00 |
| | | | | 416/41 |
| 2010/0014971 | A1 | 1/2010 | Risager et al. | |
| 2010/0135801 | A1* | 6/2010 | Melius | F03D 7/0224 |
| | | | | 416/44 |
| 2012/0193918 | A1* | 8/2012 | Mascarell | F03D 7/0276 |
| | | | | 290/44 |
| 2012/0237346 | A1* | 9/2012 | Mascarell | F03D 7/043 |
| | | | | 416/1 |
| 2018/0051669 | A1* | 2/2018 | Benazzi | F03D 7/0204 |

FOREIGN PATENT DOCUMENTS

| | | |
|---|---|---|
| EP | 1483501 A2 | 12/2004 |
| FR | 2413566 A1 | 7/1979 |
| GB | 2443886 A | 5/2008 |
| GB | 2527329 A | 12/2015 |
| WO | 2017144063 A1 | 8/2017 |

OTHER PUBLICATIONS

Danish Patent and Trademark Office First Technical Examination for Application No. PA201670109 dated Nov. 8, 2016.
Patent Cooperation Treaty International Search Report for Application No. PCT/DK2017/050047 dated May 31, 2017.

* cited by examiner

WIND TURBINE SYSTEM WITH MULTIPLE ROTORS

FIELD OF THE INVENTION

The present invention relates to a wind turbine system, more particularly a wind turbine system with a plurality of wind turbine modules, i.e. a wind turbine system with multiple rotors, and a corresponding method, a computer program product and a control system.

BACKGROUND OF THE INVENTION

The most common type of wind turbine is the three-bladed upwind horizontal-axis wind turbine (abbreviated HAWT). In this type of wind turbine, or wind turbine generator, the rotor with the corresponding blades is positioned at the front of a nacelle, the nacelle itself being mounted on top of a vertical wind turbine tower.

Alternatively, a wind turbine system with a plurality of wind turbine modules can be mounted to a support structure, for example with only a single tower supporting several wind turbine modules, the wind turbine modules can be mounted in several different layers in the vertical direction. Wind turbine system of this kind are also known in the field as multi-rotor array-type wind turbines. These wind turbine systems have several advantages, in particular in connection with transport, upscaling, and flexibility compared to conventional HAWTs. However, such wind turbine systems also have some disadvantages, in particular the mechanical loads will be more difficult to handle, for example because the wind turbine modules may interact with each other, and the support structure will be required to support more complex, dynamic loads as compared to wind turbine towers for conventional HAWTs. The concept of multi-rotor array-type wind turbines has been known for some time, but the associated problems have unfortunately been a barrier for implementation on any significant commercial scale in the wind turbine industry.

US patent application 2012/02373346 (to Gamesa Innovation & Technology S.L.) discloses a method for using pitch and torque control means for counteracting rotor asymmetric loads, such as wind shear, upflow, yaw misalignment etc. Based on wind speed/direction measurements and static and dynamic parameters of the wind turbine, a pitch command is added to a collective pitch of the rotor blades, and a counteracting effect is provided. However, this teaching is related to conventional single-rotor wind turbines and not to multi-rotor array-type wind turbines.

Hence, an improved wind turbine system would be advantageous, and in particular a wind turbine system enabling an improved handling of the dynamic loads exerted by the wind turbine modules on the support structure.

SUMMARY OF THE INVENTION

It may be seen as an object of the present invention to provide a wind turbine system that solves in particular the above mentioned problems with dynamical loads in a wind turbine system with a plurality of wind turbine modules.

The above described object is intended to be obtained in a first aspect of the invention by providing a wind turbine system comprising:
   a plurality of wind turbine modules mounted to a support structure including a tower, wherein each of the plurality of wind turbine modules comprises:
   a rotor,
   a power generation system driven by the rotor, and
   a rotor blade pitch adjustment system for pitching of a plurality of rotor blades;
   an input arrangement for receiving load data associated with the plurality of wind turbines modules and/or the support structure, and
   a control system operably connected to said input arrangement for receiving load data, the control system being configured to determine a lift command for a particular wind turbine module of the plurality of wind turbines modules;
   wherein the control system is arranged for applying the lift command to the corresponding rotor blade pitch adjustment system of said particular wind turbine module so as to create a lift force (F_up) in the opposite direction of gravity on the said particular wind turbine module mounted on the support structure.

The invention is particularly, but not exclusively, advantageous for obtaining a wind turbine system, where the dynamical loads from the wind turbine modules can be handled in a more beneficial way by providing a upwards lift force on one, or more, particular wind turbine module(s) that may reduce, possibly in some situations eliminate, such dynamical loads from the wind turbine module on the support structure, because the provided lift force can be specifically tailored to the varying requirements over time, for example depending on the desired operating conditions of the wind turbine system (e.g. power production) and/or external parameters for the wind turbine system, such as wind conditions (e.g. wind speed, direction, and/or density).

In turn, the present invention thereby facilitates new and advantageous designs of the support structure hitherto not possible in practical implementation of such wind turbine systems, especially the possibility of compensating, at least partly, the action of gravity on a particular wind turbine module during sufficient wind conditions and by appropriately varying the corresponding rotor blade pitch opens up for various new designs and configurations of the support structures. In short, the previous design constrains on the support structure will be relaxed to some degree. It should however be understood that the provided lift force is dependent on a sufficient amount of wind i.e. under little or no-wind conditions the support structure should of course be able to support the wind turbine modules without jeopardising the overall mechanical stability of the wind turbine system. The variation of the rotor blade pitch is typically periodic within one rotor rotation period (1P), though other periods are also contemplated depending on the circumstances.

With respect to the term 'as to create a lift force (F_up) in the opposite direction of gravity on the said particular wind turbine module', it is to be understood that the lift force may preferably be in the opposite direction of the gravity, but also having a sufficient magnitude to compensate, wholly or partly, the action of gravity. In some embodiments, the provided lift may be larger than the action of gravity, e.g. due to downwards wind direction. In yet other embodiments, the provided lift force is constant over time, such as substantially constant over time taken into account the time dependency of the wind and/or the cyclic variation of the pitching performed of the rotor blades. Thus, in some embodiments, the lift force of a wind turbine module may be controlled so that the average value is within a predetermined interval of values. Thus, a constant lift force can be applied for static loads on the support structure, in particular from the action of gravity. In still other embodiments, the provided lift force may further comprise a periodic component, e.g. for compensating vibrations or similar. In some embodiments, the provided lift force can have a resulting force parallel to gravity, in which case the lift force (F_up) will normally be taken to be negative, or have a negative magnitude. Thus, the present invention may be also beneficially be applied for compensating, wholly or partly, dynamic loads varying over time, i.e. both periodic dynamic loads (e.g. from vibrations) or non-periodic dynamic loads (e.g. from the fluctuating wind).

In particular advantageous embodiments, the support structure may comprise arms extending outwards from the tower, each of the plurality of wind turbine modules being mounted on a part of a corresponding arm. Additionally or alternatively, the support structure may then further comprise an underlying support arm extending from a lower position on the tower, relative to the arm, to an end position on the arm, wherein the sensor arrangement is preferably configured for receiving load data from the underlying support arm, directly or indirectly.

Additionally or alternatively, the support structure may further comprise support connection means extending from a higher position on the tower, relative to the arm, to a position on the arm, wherein the sensor arrangement is preferably configured for receiving load data from these support connection means, directly or indirectly, which could preferably be flexible connection means such as wires, cables, chains or other similar means supporting a relative large tension relative to their weight. In case of the support connection means comprising wires, cables or chains, it is a particular advantage to have a certain minimum pre-tension in the wires, cables or chains, possibly a pre-tension within a predetermined interval, which could be ensured via the sensor arrangement being configured for measuring, directly or indirectly, strain or tension in the wires, cables or chains, and the control system in turn providing the corresponding lift force (F_up) on the related wind turbine module(s). In some cases, the appropriate lift force could be positive, which may be the situation most of the time, but in other situations the appropriate lift force (F_up) could be negative to ensure a certain minimum pre-tension in the wires, cables or chains. Thus, the support structure may further comprise flexible support connection means, preferably chains, wires or cables, extending from a higher position on the tower, relative to the arm, to a position on the arm, the control system being arranged to create a lift force (F_up) based on said load input from the support connection means of an appropriate size and magnitude on said particular wind turbine module so to provide a predefined minimum pre-tension in the corresponding flexible support connection means.

In relation to the afore mentioned US patent application 2012/02373346, it should be emphasized that this disclosure is primarily focussed on changing wind conditions causing asymmetric, preferably periodic, loads in the form of unwanted bending moments on the wind turbine structure, whereas the present invention is related to providing a compensating lift force on the one, or more, wind turbine module (s), for example also under static load conditions. This difference is important because the method in the US patent application generates moments, which for a multirotor nacelle supported by an arm which is mainly extending in the horizontal direction resulting in a torsion of the arm. In the present initial design of the 4TT (2-by-2 wind turbine modules in a substantial horizontal plane) MR wind turbine system erected at Risø, Denmark, the present applicant has found that torsion of the arm may be a design driving factor, even without extra torsion caused by active tilt of the rotor.

By generating a vertical force instead of a torsional moment, the resulting additional torsion on the arm is lowered leading to a lower cost for the supporting arms emphasizing the significant difference and advantage over the method applied by US patent application 2012/02373346.

With respect to the term 'input arrangement for receiving load data', it is it to understood that the input arrangement does not perform an actual measurement of load data, the input arrangement is however arranged for receiving load data associated with the plurality of wind turbine modules and/or the support structure. The said load data may for example be obtained from sensors arranged in a sensor system and/or model calculations or estimates, as it will be explained in more detail below.

In some advantageous embodiments, the lift command may comprises a first sub-command being a collective pitch angle common for the rotor blades in said particular wind turbine module, and a second sub-command being different for each rotor blade in said particular wind turbine module, each second sub-command further comprising a common cyclic pitch amplitude and a periodic function dependent on a rotor position, said periodic function being different for each rotor blade, thereby facilitating first sub-command for conventional pitching of the rotor blades, and an additional second sub-command with information for a suitable cyclic pitching of the rotor blades in order to provide said lift force in a direction opposite to gravity on the particular wind turbine module. More beneficially, it is thereby possible that the control system may be arranged for calculating the lift force (F_up) in the opposite direction of gravity on the said particular wind turbine module under an assumption, or condition, that the common cyclic pitch amplitude ($\theta\_MRL$) is proportional to the product of a desired lift force (F) on the wind turbine module (2'), and a general pitch sensitivity with respect to the lift force ($d\theta/dF$), as will be further explained below by a specific formula.

In advantageous embodiments, the control system may additionally be arranged for calculating the lift force (F_up) in the opposite direction of gravity on the said particular wind turbine module under a further assumption, or condition, that the general pitch sensitivity with respect to the lift force ($d\theta/dF$) is a fraction of the pitch sensitivity with respect to the lift force on a specific rotor blade ($d\theta\_0/dF$), preferably the fraction being equal to $2/3$ for a wind turbine module with three blades, this feature enabling more simplified and/or faster calculations, or estimates, of the lift force.

In other advantageous embodiments, the control system may be additionally, or alternatively, arranged for calculating the lift force (F_up) in the opposite direction of gravity on the said particular wind turbine module using a table, e.g. a lock-up table (LUT) with values of the general pitch sensitivity with respect to the lift force ($d\theta/dF$), and/or values of the general pitch sensitivity with respect to the lift force ($d\theta/dF$) calculated by modelling in the control system, such as blade elements models (BEM) of the relevant wind turbine module, which may also facilitate more simplified and/or faster calculations, or estimates, of the lift force.

In another embodiment, the lift command when applied to the rotor blade pitch adjustment system may comprise one common command for the said particular wind turbine module, the common command being mechanically converted into different pitch adjustments of the rotor blades at the rotor in the wind turbine module, preferably the rotor blade pitch adjustment system comprises a Swash plate-arrangement adapted therefore, or other similar mechanically conversion system that the skilled person would consider once the general teaching and principle of the present invention is acknowledged. This embodiment is relatively simple from a control point of view requiring only a single control signal for the wind turbine module.

In a second aspect, the invention relates to method for operating a wind turbine system, the wind turbine system comprising:
- a plurality of wind turbine modules mounted to a support structure including a tower, wherein each of the plurality of wind turbine modules comprises:
  - a rotor,
  - a power generation system driven by the rotor, and
  - a rotor blade pitch adjustment system for pitching of a plurality of rotor blades;

the method comprising:
- receiving load data associated with the plurality of wind turbines modules and/or the support structure,—connecting a control system to said input arrangement for receiving load data,
- determining a lift command for a particular wind turbine module of the plurality of wind turbines modules, and
- applying the lift command to the corresponding rotor blade pitch adjustment system of said particular wind turbine module to create a lift force (F_up) in the opposite direction of gravity on the said particular wind turbine module mounted on the support structure.

In a third aspect, the invention relates to a computer program product having instructions which, when executed cause a computing device or a computing system, such as a control system, to perform a method according the second aspect.

In a fourth aspect, the invention relates to control system for controlling a wind turbine system, said control system being arranged for controlling said wind turbine system according to a method according to the second aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DESCRIPTION OF EMBODIMENTS

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
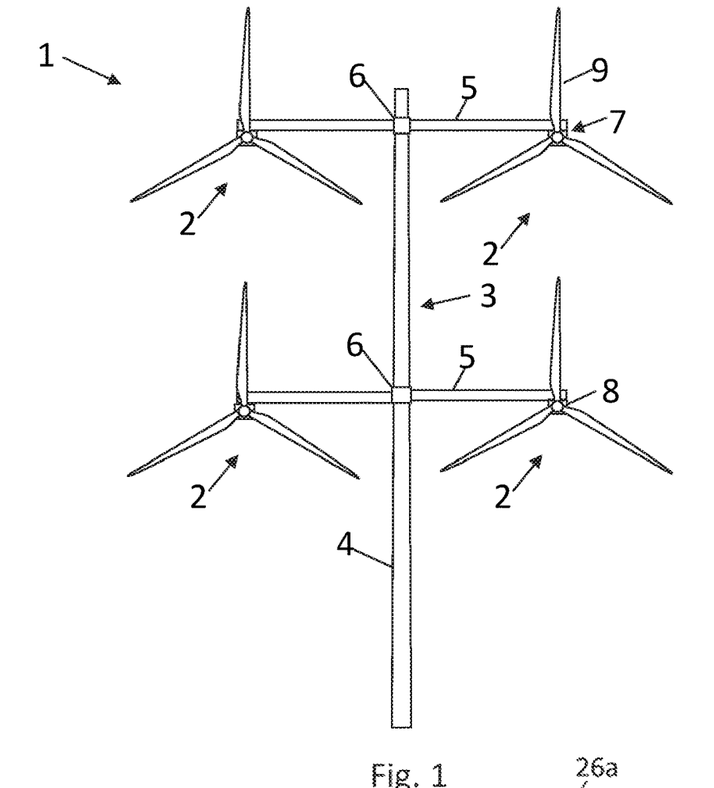
FIG. 1 depicts a wind turbine system according to the present invention.

FIG. 1 depicts a wind turbine system 1, wherein the wind turbine system is comprising:
- a support structure 3 including a tower 4 and arms 5 mounted to the tower 4 at junctions 6,
- a plurality of wind turbine modules 2 mounted to the support structure 3 wherein each of the plurality of wind turbine modules comprises a rotor 7 with rotor blades 9.
- a rotor blade pitch adjustment system (not shown here) for pitching of a plurality of rotor blades 9;

In the present embodiment, the support structure comprises arms 5 extending outwards from the tower 4, each of the plurality of wind turbines modules being mounted on an end part of a corresponding arm, though other positions on the arms are of course possible, in particular when more than one wind turbine module is mounted on a right or left arm 5 extending from the support structure 3. Furthermore, FIG. 1 depicts a nacelle 8 for each wind turbine module.

FIG. 1 shows a support structure with two arms 5 each having two wind turbine modules 2, but other embodiments are of course conceivable, e.g., four arms with four wind turbine modules each or three arms with lower, middle and upper arm, respectively having six, four and two wind turbine modules. The wind turbine modules may be in the same vertical plane, or they may be shifted relative to each other. In the wind turbine modules 2, the kinetic energy of the wind is converted into electrical energy by a power generation system (not shown), as it will be readily understood by a person skilled in wind turbines.

Figure 2:
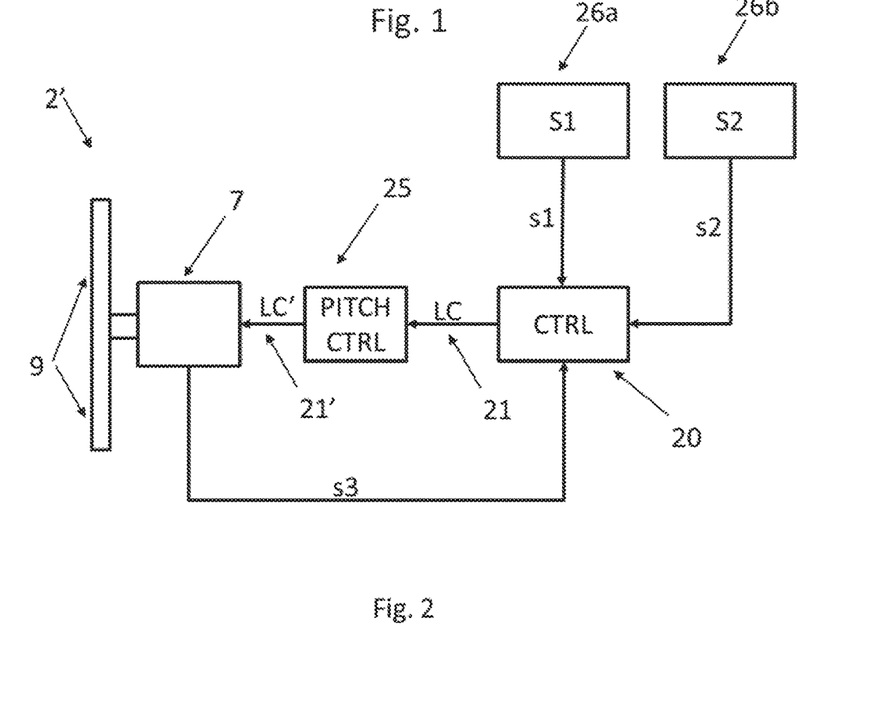
FIG. 2 schematically shows a part of a wind turbine system according to the present invention, FIG. 3 schematically shows a wind turbine module of a wind turbine system according to the present invention.

The wind turbine system further comprises a control system CTRL 20 as schematically shown in FIG. 2. FIG. 2 shows a part of a wind turbine system wherein the control system 20 is arranged for pitching rotor blades 9 on the rotors 7 (where each rotor 7 comprises a hub 11 which rotor blades 9 are attached to). The control system 20 of the wind turbine system comprises an input arrangement, e.g. corresponding data ports and sections, for receiving load data, s1, s2, and s3, associated with the plurality of wind turbines modules and/or the support structure. By way of example, in FIG. 2 the data s1 and s2 originates from sensor S1 26a and S2 26b, respectively, whereas load data s3 comes from the nacelle. Load data s1 could for example be load data from the support structure 3 obtained from suitable strain gauges/sensors (not shown), whereas load data s2 could be related vibration data from the support structure. Load data s3 could for example be load data from the rotor blades 9 (from one, more or all of them). The control system 20 and 25 is operably connected to the input arrangement for receiving load data, s1, s2 and s3. The control system 20 and 25 is also configured to determine a lift command 21 and 21' for a particular wind turbine module 2' of the plurality of wind turbines modules 2. Needless to say, the control system 20 and 25 may generate lift commands for more than one wind turbine module 2', in particular for all of the wind turbine modules 2 in the wind turbine system 1.

The input arrangement can be operably connected to a sensor system, 26a and 26b, for measuring load data, s1, s2, and s3 associated with the plurality wind turbine modules and/or the support structure, preferably the sensor arrangement, 26a and 26b, comprises one, or more, sensor elements positioned on, at, or near the particular wind turbine module 2', e.g. strain gauges, accelerometers, vibrations sensors, gyros, position sensors, optical sensors or similar sensing means capable of yielding load related data. More preferably, such sensor elements can be positioned on, or at, the rotor blades 9 of the particular wind turbine module 2, and/or the support structure 3 and tower 4, possibly outside or below the support structure, e.g. optical sensors measuring at a distance from a ground position.

As also shown in FIG. 2, the control system is arranged for applying the lift command 21 to the corresponding rotor blade pitch adjustment system, PITCH CTRL and other parts (not shown) in the nacelle 7, of said particular wind turbine module 2' so as to create a lift force, F_up, in the opposite direction of gravity on the particular wind turbine module mounted on the support structure 3.

Figure 3:
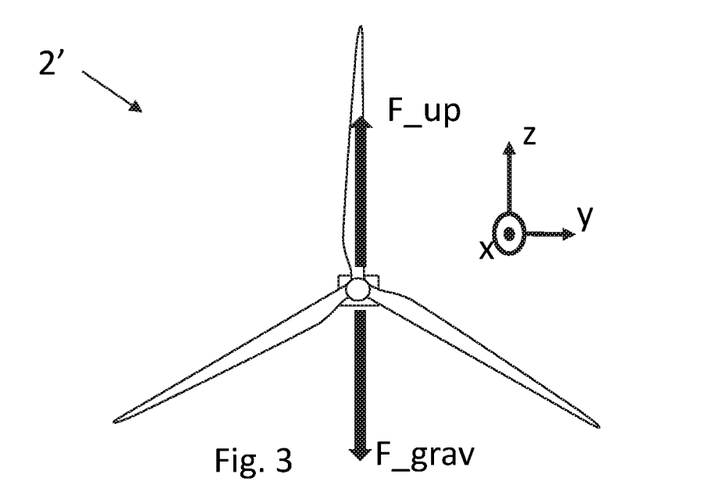

FIG. 3 schematically shows a wind turbine module 2' of a wind turbine system according to the present invention together with directions of a so-called fixed nacelle coordinate system to the right. The lift force F_up is shown to be in z-direction of the nacelle coordinate system and being in an opposite direction of the gravity action on the wind turbine module 2', more specifically on the center of mass of the wind turbine module 2'. As explained previously, the lift force can have static and/or dynamic components depending on the load that are to be compensated, wholly or partly.

In another embodiment, the lift command when applied to the rotor blade pitch adjustment system comprises one common command for the said particular wind turbine module 2', the common command being mechanically converted into different pitch adjustments of the rotor blades at the rotor 7 in the wind turbine module, preferably the rotor blade pitch adjustment system comprises a Swash plate-arrangement adapted therefore, or other similar mechanically conversion system that the skilled person would consider once the general teaching and principle of the present invention is acknowledged. This embodiment is relatively simple from a control point of view requiring only a single control signal for the wind turbine module.

Figure 4:
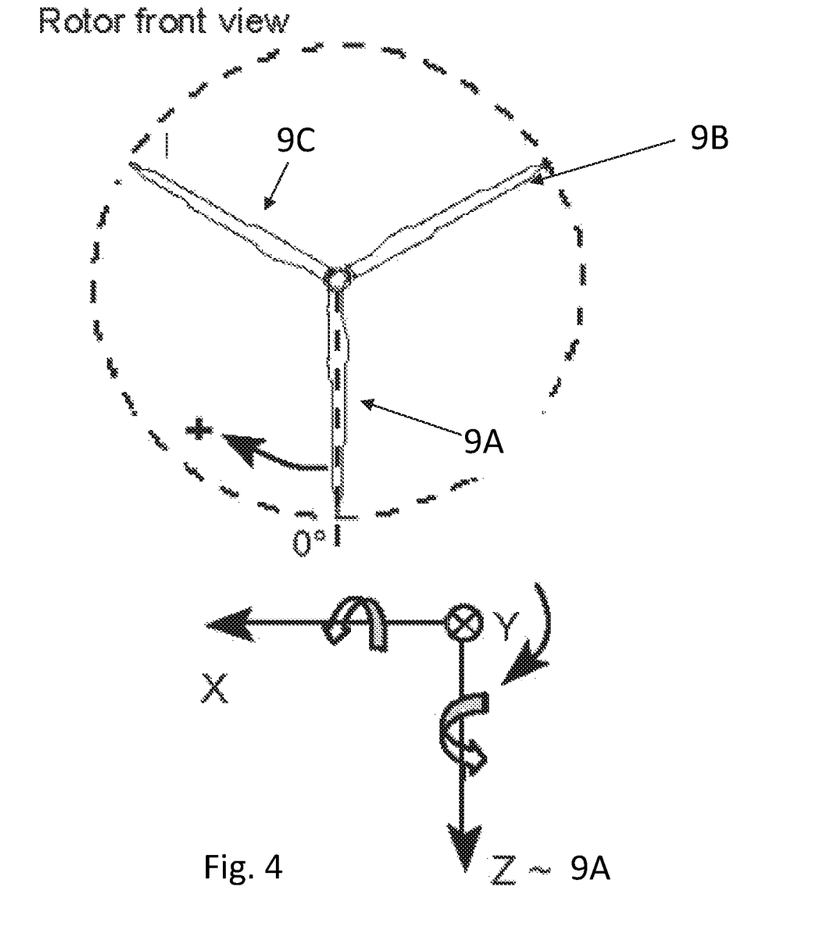
FIG. 4 shows a so-called rotor rotating coordinate system of a wind turbine module, FIG. 5 schematically shows a control system for implementing the present invention, FIG. 6 schematically shows another control system for implementing the present invention.

FIG. 4 shows a front view of a so-called rotor rotating coordinate system of a wind turbine module with rotor blades, 9A, 9B and 9C, or just blades A, B, C in the following.

The pitch reference for the rotor blades A, B, C can thereby written as:

$$\begin{cases} \vartheta_A(t) = \vartheta_0(t) + \vartheta_{MRL}(t)\sin(\varphi(t)) \\ \vartheta_B(t) = \vartheta_0(t) + \vartheta_{MRL}(t)\sin\left(\varphi(t) - \frac{2}{3}\pi\right) \\ \vartheta_C(t) = \vartheta_0(t) + \vartheta_{MRL}(t)\sin\left(\varphi(t) - \frac{4}{3}\pi\right) \end{cases}$$

Where $\vartheta_0(t)$ is the collective pitch angle for the blades and $\varphi(t)$ the rotor position as shown in FIG. 4, the blade 9A having $\phi=0$ at a downwards vertical position. Thus, the lift command may generally comprises a first sub-command being a collective pitch angle θ_0 common for the rotor blades 9 in said particular wind turbine module 2', and a second sub-command, θ_A_UP, θ_B_UP, θ_C_UP, being different for each rotor blade, 9A, 9B, and 9C, in said particular wind turbine module 2';

θ_A=θ_0+θ_A_UP

θ_B=θ_0+θ_B_UP,

θ_C=θ_0+θ_C_UP

Each second sub-command then further comprises a common cyclic pitch amplitude, θ_MRL, and a periodic function dependent on a rotor position, φ, the periodic function being different for each rotor blade 9A, 9B, and 9C.

To generate a lift force F_up on the wind turbine modules as shown in FIG. 3, the common cyclic pith amplitude, $\vartheta_{MRL}(t)$, can be calculated under the assumption that it is proportional to the desired force and general pitch sensitivity with respect to force:

$$\vartheta_{MRL}(t) = F(t)\frac{\partial\vartheta}{\partial F}$$

A constant lift can then be generated by computing the amplitude as shown above and inserting the common cyclic pith amplitude in the equation for calculating individual pitch angles. Typically values of the common cyclic pitch amplitude can be in the range of [−0.1;0.1] radians. Notice that the general pitch sensitivity with respect to force, $$\frac{\partial\vartheta}{\partial F},$$

depends on the operating condition of the wind turbine, specifically wind speed, rotor speed, air density and collective pitch angle, θ_0. The value can be found either from a preprocessed table with on-line lookup, or using an online BEM method. Thus, the control system 20 and 25 can be arranged for calculating the lift force F_up in the opposite direction of gravity on the said particular wind turbine module using a table with values of the general pitch sensitivity with respect to the lift force (dθ/dF), and/or values of the general pitch sensitivity with respect to the lift force (dθ/dF) calculated by modelling in the control system.

Specifically, it can be computed by the pitch to in plane force sensitivity as:

$$\frac{\partial\vartheta}{\partial F} = \frac{2}{3}\frac{\partial\vartheta_0}{\partial F}$$

But in general, a further assumption is that the general pitch sensitivity with respect to the lift force, dθ/dF, is a fraction of the pitch sensitivity with respect to the lift force on a specific rotor blade, dθ_0/dF, more particularly the in-plane force on a specific rotor blade. The above relation can be deduced from the fact that the vertical force, F_up being equal to $F_z$ in the nacelle coordinate system, generated by the rotor can be computed using a transformation from the rotor rotating coordinate system (shown in FIG. 4) back to the nacelle coordinate system (shown in FIG. 3):

$$F_z(t) = F_{x,A}(t)\sin(\varphi) + F_{x,B}(t)\sin\left(\varphi - \frac{2}{3}\pi\right) + F_{x,C}(t)\sin\left(\varphi - \frac{4}{3}\pi\right)$$

Where $F_{x,i}$ is the in-plane projection force on the rotor blades which can be approximated as:

$$F_{x,i} = F_{x,0} + \frac{\partial F}{\partial\vartheta_0}(\vartheta_i - \vartheta_0)$$

With $F_{x,0}$ being the force generated from the collective pitch angle and equal for all blades.

Figure 5:
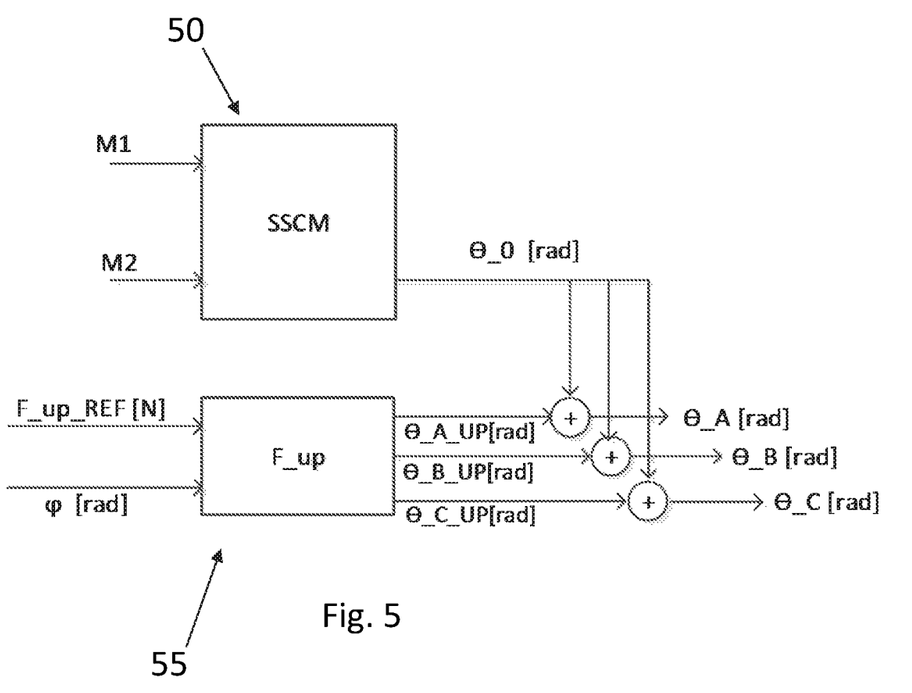

FIG. 5 schematically shows a control system for implementing the present invention. The module 50 is a standard speed control module SSCM receiving measurement data M1 and M2, e.g. wind data and desired power production, which is transformed into a collective pith angle, $\theta\_0$, for the rotor blades (not show here). In addition to the collective pith angle, the control system comprises a module 55 for providing the part of the lift command yielding the lift force F_up via the rotor blade pitch adjustment system, i.e. the second sub-command $\theta\_A\_UP$, $\theta\_B\_UP$, and $\theta\_C\_UP$. The second sub-command is calculated using a reference value for the lift force, F_up_REF, and a rotor position input, $\phi$. The first and second lift sub-command are added, as schematically shown, before sending the combined lift commands, $\theta\_A$, $\theta\_B$ and $\theta\_C$, to the particular wind turbine module 2' (not shown here) where the lift force is desired. Modules 50 and 55 may be seen as parts comprised in the general control system 20 and 25 shown in FIG. 2.

Figure 6:
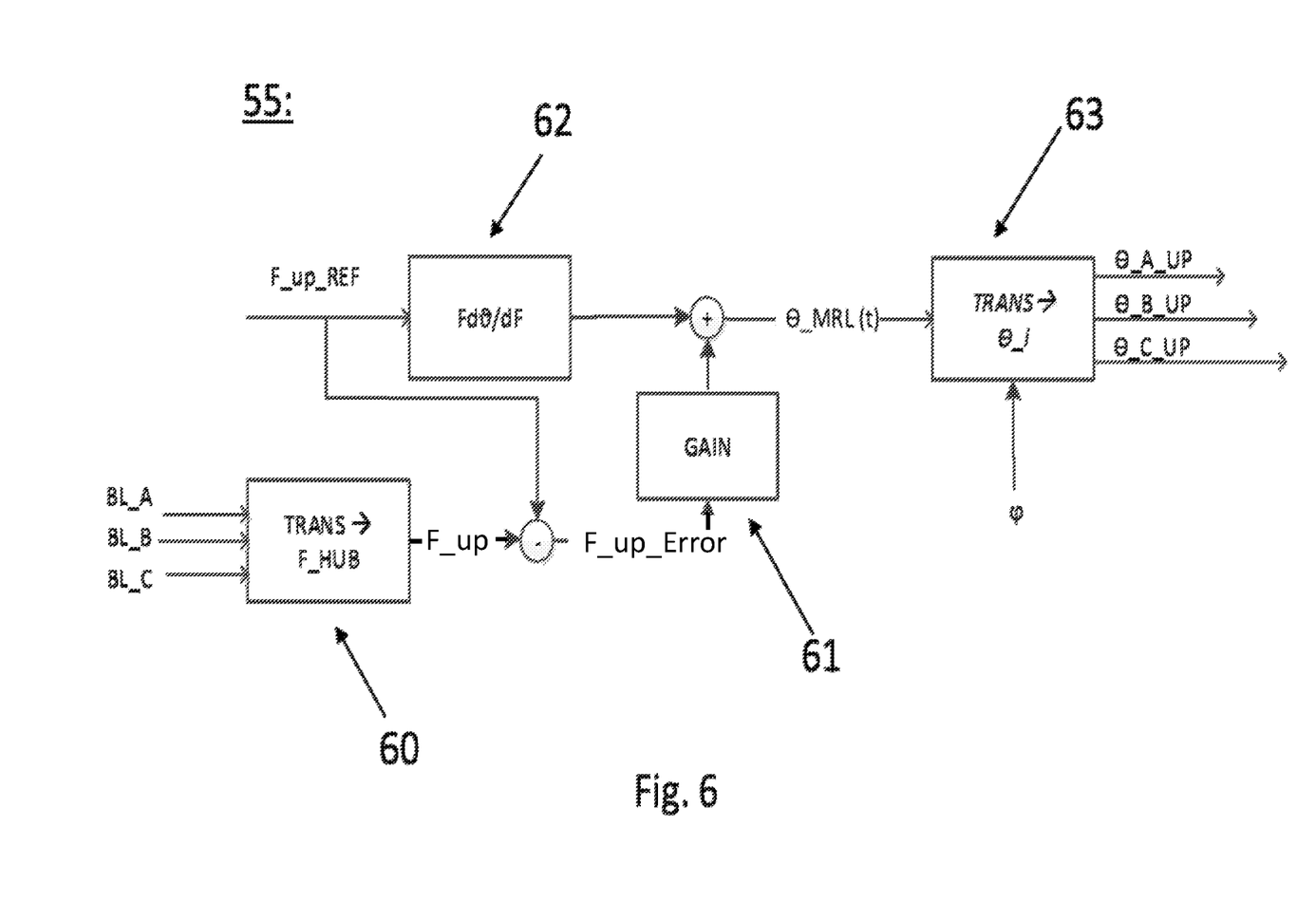

FIG. 6 schematically shows another control system for implementing the present invention with a more elaborate module 55 for calculating the second sub-command of the lift command, the module 55 providing a feedback control correction based on actual blade loads. Thus, when having a sensor arrangement operably connected to the said particular wind turbine module 2' it is advantageous to measure and/or estimate the actual lift force, F_up, from blade input load data, BL_A, BL_B, and BL_C in entity 60, and forwarding the measured and/or estimated value of the lift force to the control system, the control system having a feedback control loop 60 and 61 where a comparison, F_up_Error, between a reference value of the lift force, F_up_REF, and the actual lift force, F_up, is applied to adjust the lift command 21, in particular the second sub-command, as schematically shown. In the control loop of FIG. 6, the comparison value, F_up_Error, is multiplied by a gain 'GAIN' 61 according to experience with the specific wind turbine system and/or the required sensitivity of the response in the feedback control loop. Together with the F_up_error, the relation between the desired lift force, F, and the general pitch sensitivity with respect to the lift force found in entity 62 is used to find a common cyclic pith amplitude, $\theta\_MRL$, as a function of time, t. Thereafter, the common cyclic pith amplitude is transformed into individual second sub-commands, $\theta\_A\_UP$, $\theta\_B\_UP$, and $\theta\_C\_UP$, using the rotor positions, $\phi$, by entity 63.

Figure 7:
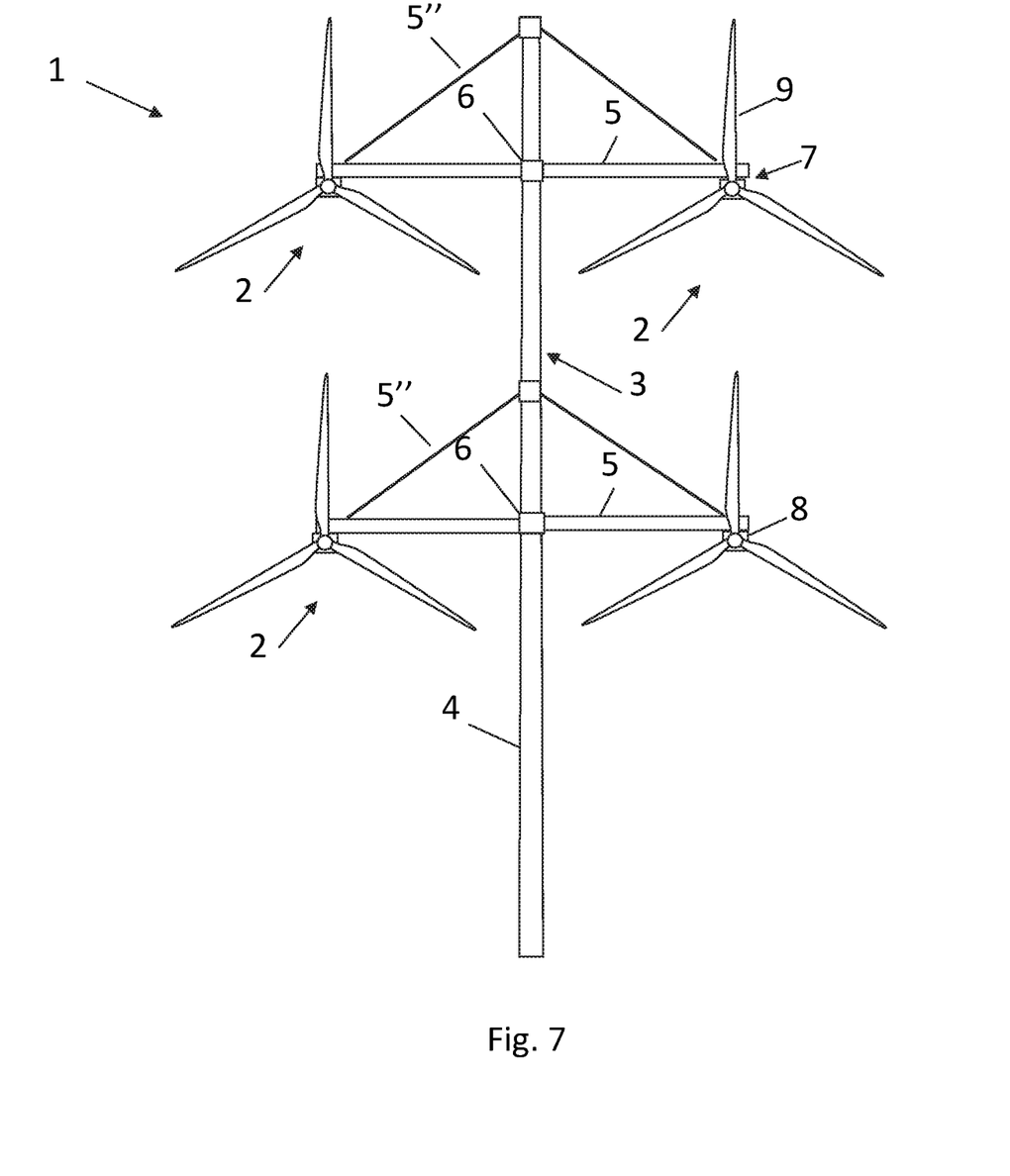
FIGS. 7, 8 and 9 depict other wind turbine systems according to the present invention.
Figure 8:
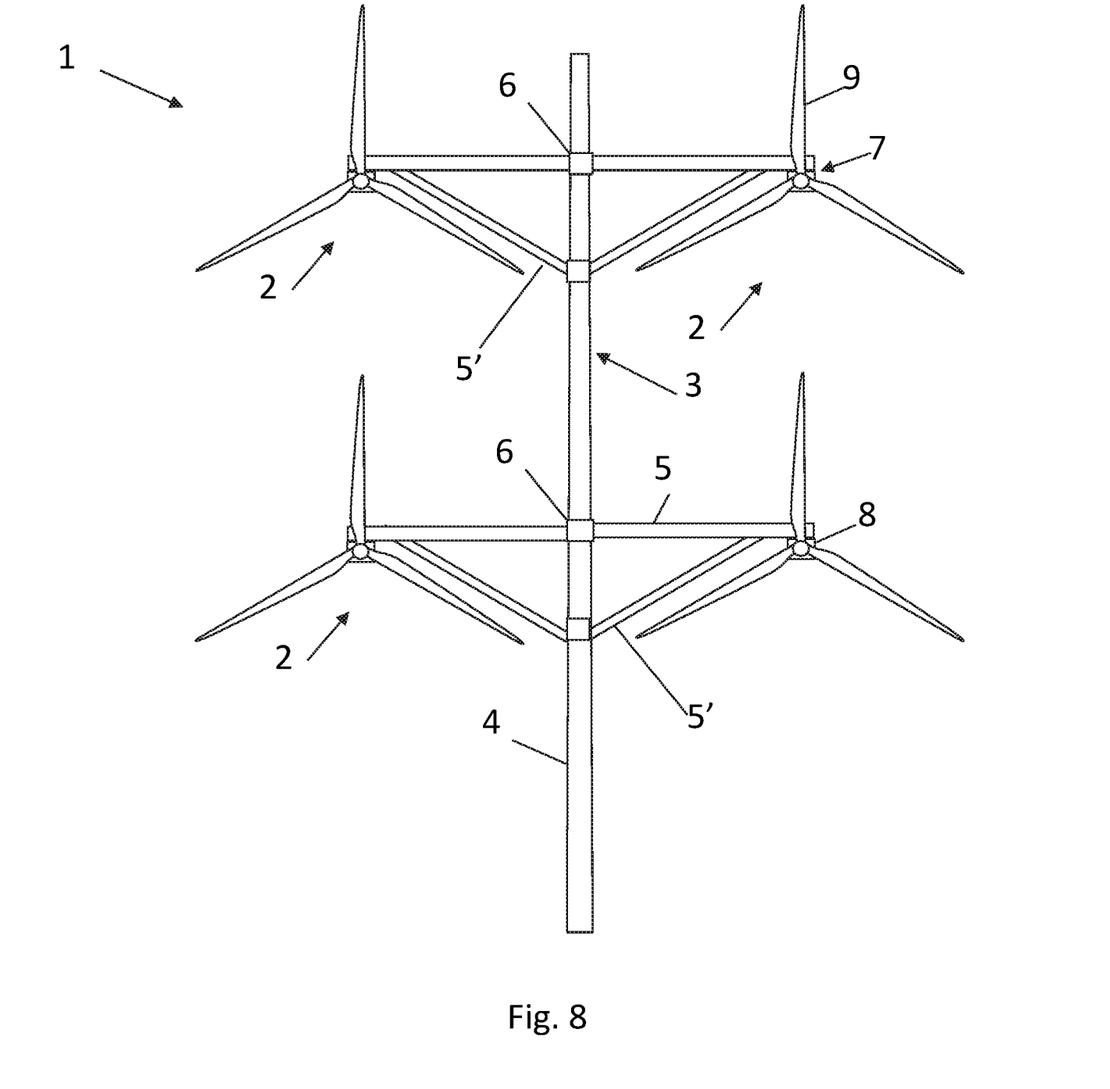

FIGS. 7 and 8 depict other wind turbine systems according to the present invention.

The wind turbine systems shown in FIGS. 7 and 8 are similar to the system shown in FIG. 2 i.e. where the structure 3 comprises arms 5 extending outwards from the tower fixed at junctions 6, each of the plurality of wind turbine modules 2 being mounted on a part of a corresponding arm 5. In the embodiments of FIGS. 7 and 8, the wind turbine modules 2 are mounted on an end part of the arm, but other positions are of course conceivable, e.g. with the modules at a middle part of the arm.

In some embodiments, the arms may be extending substantially horizontally from the tower as shown in FIGS. 7 and 8, but in yet other embodiments, the arms are extending from their fixation point on the tower with an upward direction from the tower 4, and/or the arms are extending with a downward direction from the tower 4.

In the embodiment shown in FIG. 7, the support structure further comprises support connection means 5" extending from a higher position on the tower 4, relative to the arm, to a position on the arm, wherein sensor arrangement (not shown here) can be configured for receiving load data from the support connection means 55. For example the support connection means 5" can be cables with appropriate strain gauges mounted thereon to measure the strain in the cables. The strain gauges are then connected to the control system for providing load data used as input for calculating the lift force F_up from the wind turbine modules 2 by adjusting the blade pitches accordingly.

In the embodiment shown in FIG. 8, the support structure an underlying support arm 5' extending from a lower position of fixation on the tower, relative to the arm, to an end position on the arm, wherein a sensor arrangement can be configured for receiving load data from the underlying support arm, similar to the embodiment of FIG. 7. Thus, the underlying support arm 5" can be equipped with appropriate strain gauges mounted thereon to measure the tensions in the arm. Thus, these load data can be again be used for calculating a suitable lift force F_up from the wind turbine modules 2 to compensate, wholly or partly, the static and/or dynamic loads on the wind turbine system 1.

Figure 9:
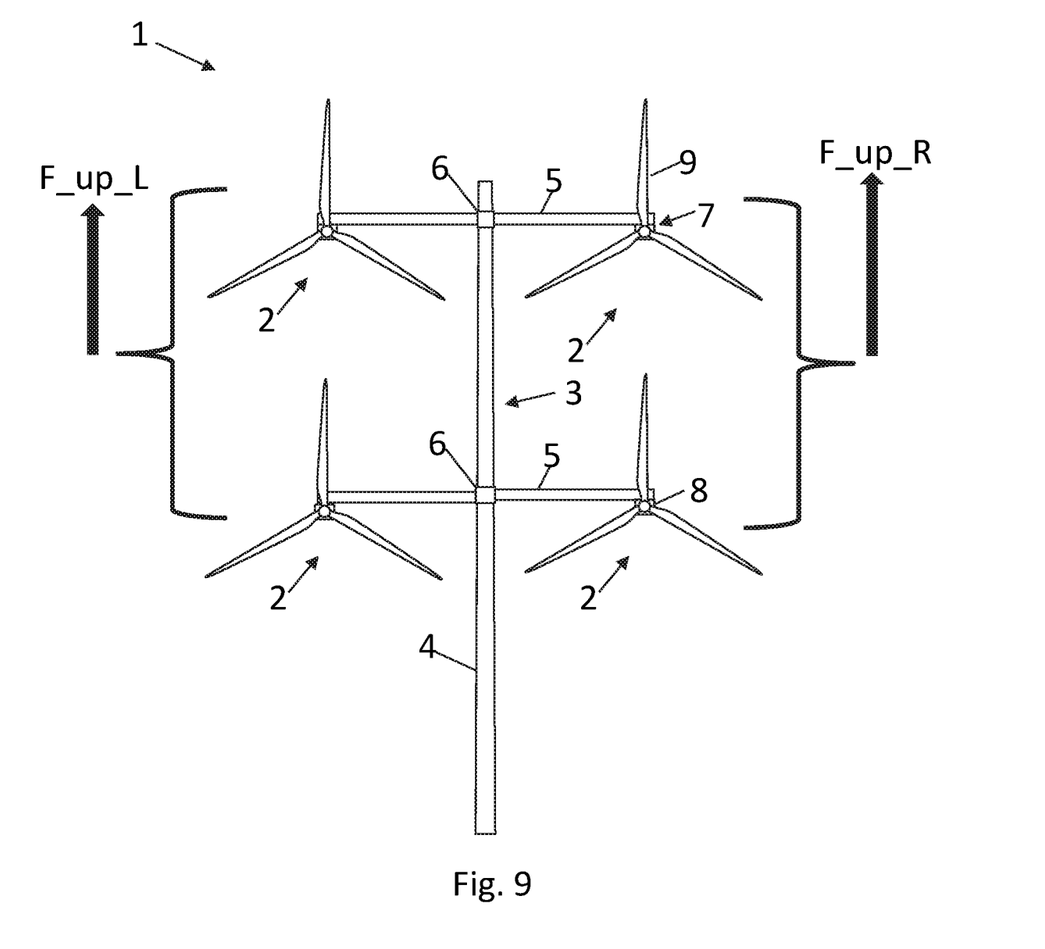

In the embodiment of FIG. 9, which is similar to the embodiment shown in FIG. 1, the two resulting lift forces provided on a plurality of wind turbine modules is schematically shown on opposite sides of the tower 4. Each resulting lift force is a sum of lift forces from the respective wind turbine modules on that side. Initial model studies performed by the inventors suggest that in a multi-rotor wind turbine system according to the present invention, there may be a risk of torsion induced on the tower 4 originating from the rotor blades on the left and right side of the central structure all rotating in the same rotational direction. However, this problem may be at least partly solved, or mitigated, by having a corresponding difference in the lift force on the left and right side of the structure 3, as schematically indicated by the two resulting lift force, F_up_L and F_up_R, respectively, the right lift force, F_up_R, being slightly larger than the left lift force, F_up_L, when the rotors rotates clockwise. The principle can of course be applied also in front and rear direction, and/or with more than two sides, i.e. in a multiple of sides around the central tower.

Summarizing, the control system 20 and 25 of the present invention can be further configured to determine the lift command 21 for the said particular wind turbine module 2' of the plurality of wind turbine modules 2 based also on load input from said underlying support arm 5', and/or said support connection means 5". In some embodiments, the lift command can additionally be based on predefined upper and/or lower limits for acceptable load input values in the underlying support arm 5', e.g. maximum tension, and the support connection means 5", e.g. maximum strain of a cable.

In general, the wind turbine system according to the present invention comprises a control system 20 further being arranged for receiving estimates of load based on model calculations of the plurality of wind turbine modules 2, the support structure 3, and/or external operation parameters influencing the wind turbine system, including, but not limited to, wind speed/direction and power production, etc. The model calculation of loads can be forwarded to the input arrangement for receiving load data, and in turn applied in the control system according to the present invention.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine system comprising:
a plurality of wind turbine modules mounted to a support structure including a tower and arms extending outwards from the tower, wherein each of the plurality of wind turbine modules is mounted on a corresponding arm and comprises:
a rotor,
a power generation system driven by the rotor, and
a rotor blade pitch adjustment system for pitching of a plurality of rotor blades coupled to the rotor;
an input arrangement for receiving load data associated with at least one of the plurality of wind turbines modules or the support structure, and
a control system operably connected to said input arrangement for receiving the load data, the control system being configured to determine a lift command for a particular wind turbine module of the plurality of wind turbines modules;
wherein the control system is arranged for:
applying the lift command to the corresponding rotor blade pitch adjustment system of said particular wind turbine module so as to create a first lift force in the opposite direction of gravity on the said particular wind turbine module mounted on the support structure; and
applying lift commands to corresponding rotor blade pitch adjustment systems to create a second lift force in a wind turbine module on one side of the tower and a third lift force greater than the second lift force in a wind turbine module on an opposite side of the tower to compensate, at least partly, for torsion moments caused by a common rotational direction of the rotors in the plurality of wind turbine modules.

2. The wind turbine system according to claim 1, wherein the lift command comprises:
a first sub-command being a collective pitch angle common for the rotor blades in said particular wind turbine module, and
a second sub-command being different for each rotor blade in said particular wind turbine module, each second sub-command further comprising a common cyclic pitch amplitude and a periodic function dependent on a rotor position, said periodic function being different for each rotor blade.

3. The wind turbine system according to claim 2, wherein the control system is arranged for using, in calculating the first lift force, the common cyclic pitch amplitude, wherein the common cyclic pitch amplitude is proportional to a product of a desired lift force on the wind turbine module, and a general pitch sensitivity with respect to the lift force.

4. The wind turbine system according to claim 3, wherein the control system is arranged for further using, in calculating the first lift force, the general pitch sensitivity, wherein the general pitch sensitivity with respect to the first lift force is a fraction of a pitch sensitivity with respect to the first lift force on a specific rotor blade.

5. The wind turbine system of claim 4, wherein the fraction is ⅔.

6. The wind turbine system according to claim 3, wherein the control system is arranged for using, in calculating the first lift force, a table with values of the general pitch sensitivity with respect to the first lift force, or values of the general pitch sensitivity with respect to the first lift force calculated by modelling in the control system.

7. The wind turbine system according to claim 1, wherein the first lift force has a component that is constant over time to, a least partly, compensate the action of gravity on said particular wind turbine module.

8. The wind turbine system according to claim 1, wherein the first lift force has a periodic component.

9. The wind turbine system according to claim 1, wherein the lift command, when applied to the rotor blade pitch adjustment system, comprises one common command for the said particular wind turbine module, said common command being mechanically converted into different pitch adjustments of the rotor blades at the rotor in the wind turbine module.

10. The wind turbine system of claim 9, wherein the rotor blade pitch adjustment system comprises a Swash plate-arrangement adapted to convert the common command into the different pitch adjustments.

11. The wind turbine system according to claim 1, wherein the input arrangement is operably connected to a sensor system for measuring load data associated with the plurality of wind turbine modules or the support structure.

12. The wind turbine system according to claim 11, wherein the sensor system is operably connected to the said particular wind turbine module so as to measure an actual lift force, and to forward the actual lift force to the control system, the control system having a control loop where a comparison between a reference value of the first lift force and the actual lift force is applied to adjust the lift command.

13. The wind turbine system of claim 11, wherein the sensor system comprises one, or more, sensor elements positioned on the particular wind turbine module or the support structure.

14. The wind turbine system according to claim 1, wherein the support structure further comprises an underlying support arm extending from a lower position on the tower, relative to the arm, to an end position on the arm, wherein a sensor system is configured for receiving load data from the underlying support arm, or
the support structure further comprises a support connection means extending from a higher position on the tower, relative to the arm, to a position on the arm, wherein the sensor system is configured for receiving load data from the support connection means.

15. The wind turbine system according to claim 14, wherein the control system is further configured to determine the lift command for the said particular wind turbine module of the plurality of wind turbine modules based also on load input from said underlying support arm or said support connection means.

16. The wind turbine system according to claim 15, wherein the support connection means is flexible, the control system being arranged to create a lift force based on said load input from the support connection means of an appropriate size and magnitude on said particular wind turbine module so as to provide a predefined minimum pre-tension in the corresponding flexible support connection means.

17. The wind turbine system of claim 15, wherein the control system is further configured to determine the lift command based also on predefined upper and/or lower limits for acceptable load input values.

18. The wind turbine system of claim 15, wherein the support connection means comprises a chain, a wire, or a cable.

19. The wind turbine system according to claim 1, wherein the control system further is arranged for receiving estimates of load based on model calculations of the plurality of wind turbine modules, the support structure, or external operation parameters influencing the wind turbine system.

20. The wind turbine system of claim 1, wherein the second lift force for the wind turbine module on the one side of the tower is adjusted relative to the third lift force created for the wind turbine module on the opposite side of the tower.

21. A method for operating a wind turbine system, the wind turbine system comprising:
 a plurality of wind turbine modules mounted to a support structure including a tower and arms extending outwards from the tower, wherein each of the plurality of wind turbine modules is mounted on a corresponding arm and comprises:
  a rotor,
  a power generation system driven by the rotor, and
  a rotor blade pitch adjustment system for pitching of a plurality of rotor blades;
 the method comprising:
  receiving load data associated with the plurality of wind turbines modules or the support structure,
  determining a lift command for a particular wind turbine module of the plurality of wind turbines modules, and
  applying the lift command to the corresponding rotor blade pitch adjustment system of said particular wind turbine module to create a first lift force in the opposite direction of gravity on the said particular wind turbine module mounted on the support structure; and
  applying lift commands to corresponding rotor blade pitch adjustment systems to create a second lift force in a wind turbine module on one side of the tower and a third lift force greater than the second lift force in a wind turbine module on an opposite side of the tower to compensate, at least partly, for torsion moments caused by a common rotational direction of the rotors in the plurality of wind turbine modules.

22. A computer program product having instructions which, when executed cause a computing device or a computing system to perform an operation for operating a wind turbine system, the wind turbine system comprising:
 a plurality of wind turbine modules mounted to a support structure including a tower and arms extending outwards from the tower, wherein each of the plurality of wind turbine modules is mounted on a part of a corresponding arm and comprises:
  a rotor,
  a power generation system driven by the rotor, and
  a rotor blade pitch adjustment system for pitching of a plurality of rotor blades coupled to the rotor;
 the operation comprising:
  receiving load data associated with the plurality of wind turbines modules or the support structure,
  determining a lift command for a particular wind turbine module of the plurality of wind turbines modules,
  applying the lift command to the corresponding rotor blade pitch adjustment system of said particular wind turbine module to create a first lift force in the opposite direction of gravity on the said particular wind turbine module mounted on the support structure; and
  applying lift commands to corresponding rotor blade pitch adjustment systems to create a second lift force in a wind turbine module on one side of the tower and a third lift force greater than the second lift force in a wind turbine module on an opposite side of the tower to compensate, at least partly, for torsion moments caused by a common rotational direction of the rotors in the plurality of wind turbine modules.

* * * * *